United States Patent [19]

Bivens

[11] Patent Number: 5,498,039
[45] Date of Patent: Mar. 12, 1996

[54] SPRING LOADED LATCH ASSEMBLY

[75] Inventor: Steven L. Bivens, Kankakee, Ill.

[73] Assignee: Illinois Tool Works Inc., Glenview, Ill.

[21] Appl. No.: 230,315

[22] Filed: Apr. 20, 1994

[51] Int. Cl.$^6$ .................................................. E05C 19/02
[52] U.S. Cl. ...................... 292/145; 292/81; 292/DIG. 4; 296/37.8
[58] Field of Search ....................... 292/81, 145, DIG. 4; 296/37.1, 37.8, 37.9, 37.12

[56] References Cited

U.S. PATENT DOCUMENTS

| | | | |
|---|---|---|---|
| 4,482,175 | 11/1984 | Sugie | 292/DIG. 4 X |
| 4,660,871 | 4/1987 | Arakawa et al. | 292/DIG. 4 X |
| 4,792,165 | 12/1988 | Nishimura | 292/DIG. 4 X |
| 4,846,382 | 7/1989 | Foultner et al. | 296/37.12 X |
| 4,917,416 | 4/1990 | Westphal et al. | 292/DIG. 4 X |
| 5,040,833 | 8/1991 | Brunnert | 292/DIG. 4 X |
| 5,050,922 | 9/1991 | Falcoff | 292/DIG. 4 X |
| 5,090,751 | 2/1992 | Kobayashi | 292/DIG. 4 X |
| 5,211,430 | 5/1993 | Chern | 292/DIG. 4 X |
| 5,211,431 | 5/1993 | Koizumi et al. | 292/DIG. 4 X |
| 5,217,262 | 6/1993 | Kurosaki | 292/DIG. 4 X |

FOREIGN PATENT DOCUMENTS

| | | | |
|---|---|---|---|
| 2918229 | 11/1980 | Germany | 292/DIG. 4 |
| 4201006 | 7/1992 | Germany | 292/DIG. 4 |
| 4064677 | 2/1992 | Japan | 292/DIG. 4 |
| 4115072 | 4/1992 | Japan | 292/DIG. 4 |
| 4213679 | 8/1992 | Japan | 292/DIG. 4 |
| 2080871 | 2/1982 | United Kingdom | 292/DIG. 4 |

*Primary Examiner*—Steven N. Meyers
*Assistant Examiner*—Suzanne L. Dino
*Attorney, Agent, or Firm*—Schwartz & Weinrieb

[57] ABSTRACT

A spring loaded latch assembly including a first stationary member for securement to a desired stationary surface, and a second movable member wherein the assembly provides for controlled reciprocating movement between the two members from a first closed position to a second open position upon pushing engagement by a user. The first stationary member includes a housing, a spring member secured within a portion of the housing by a retaining member and a latch arm connected thereto. The second movable member includes an engagement member in operable communication with the spring member to provide a spring force between the two members and a latch track member for cooperative engagement with the latch arm of the first member. The assembly also includes a release member that enables disengagement of the latch arm from the latch track without causing damage to the first or second members.

16 Claims, 3 Drawing Sheets

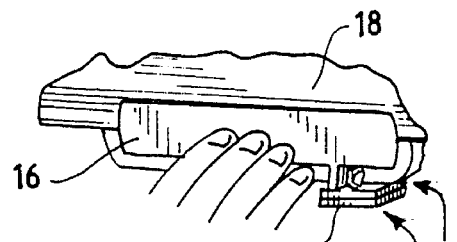
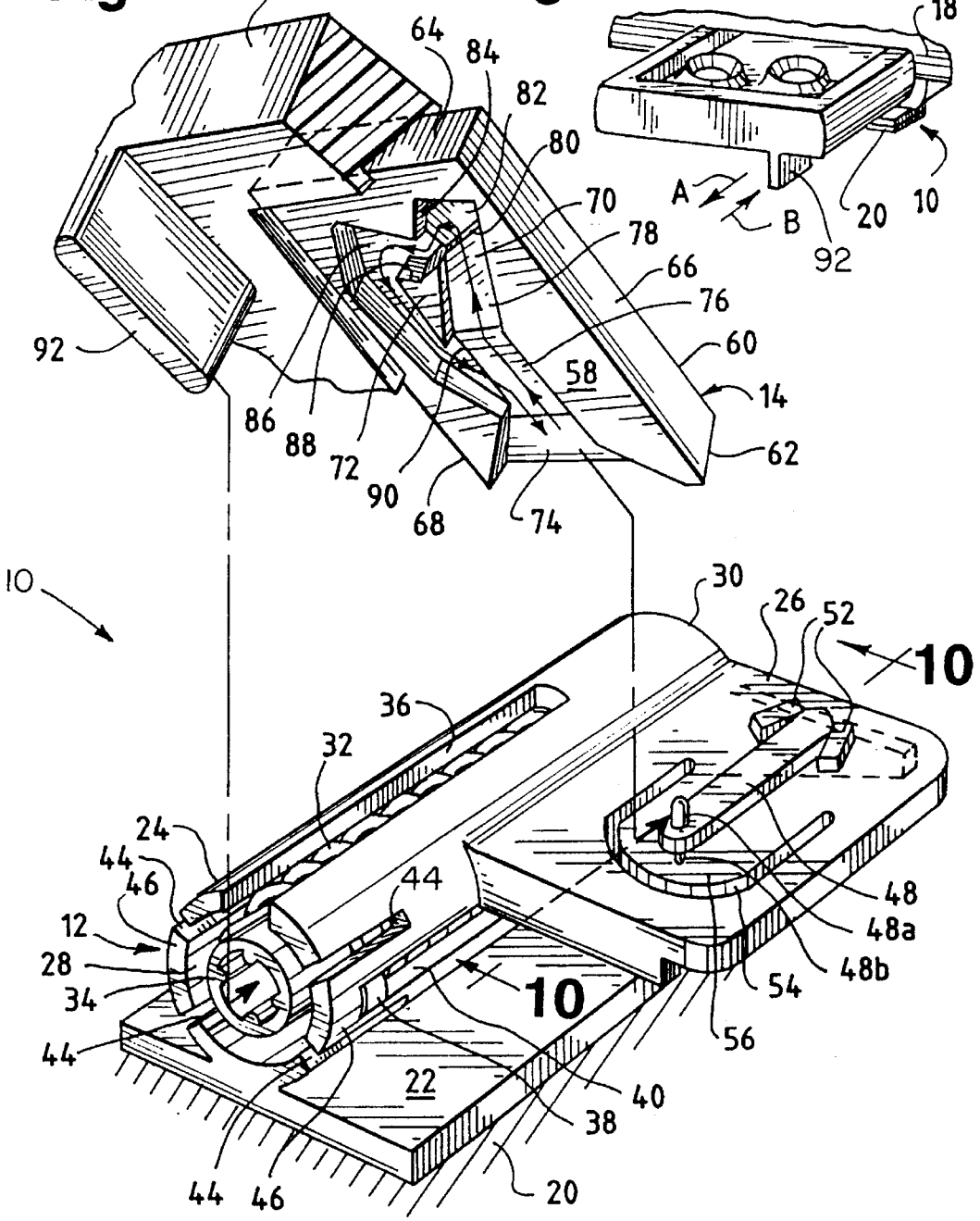

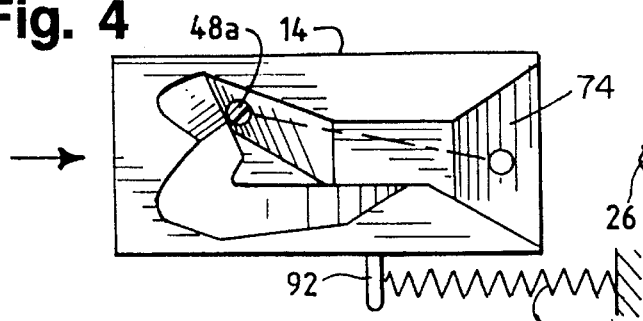
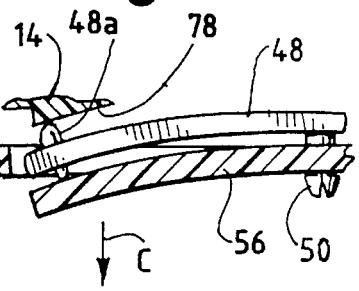
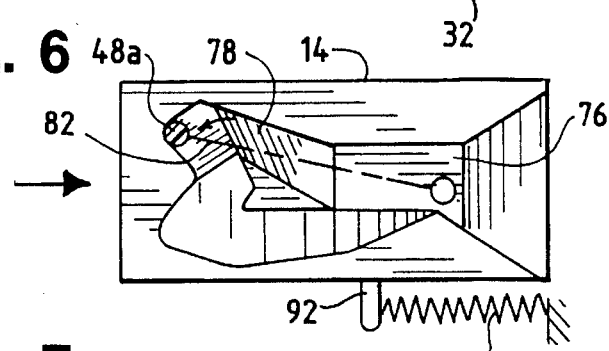
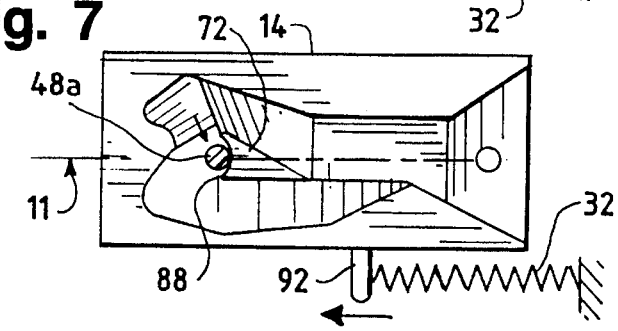
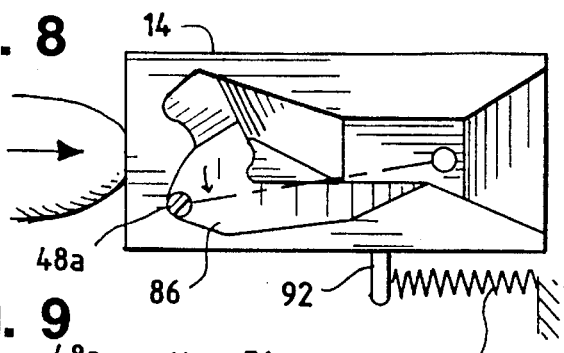
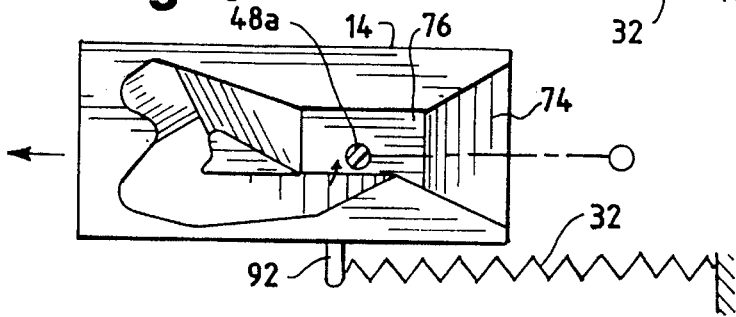

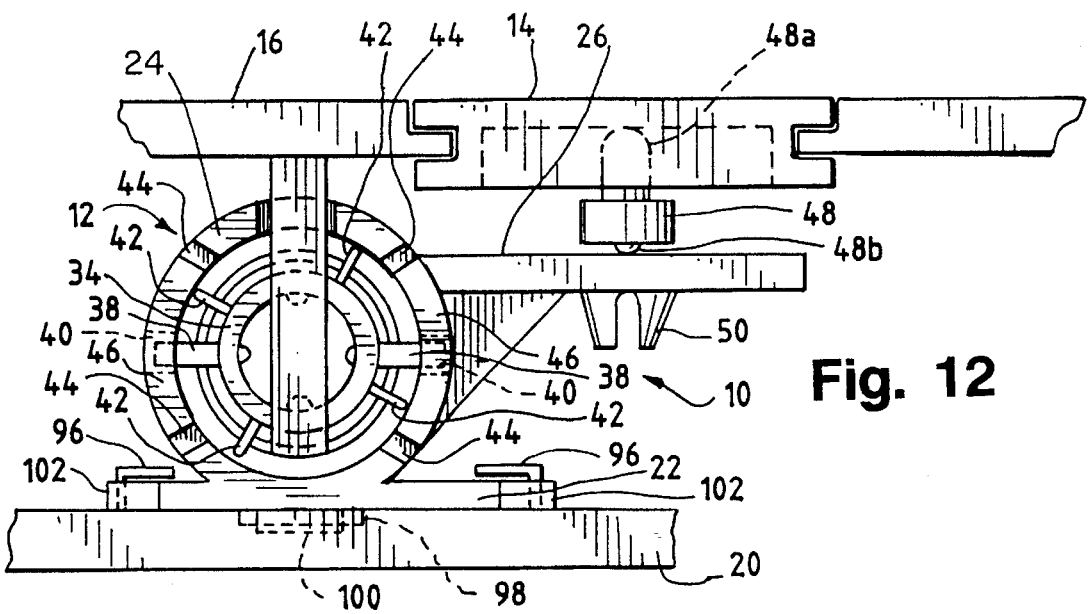
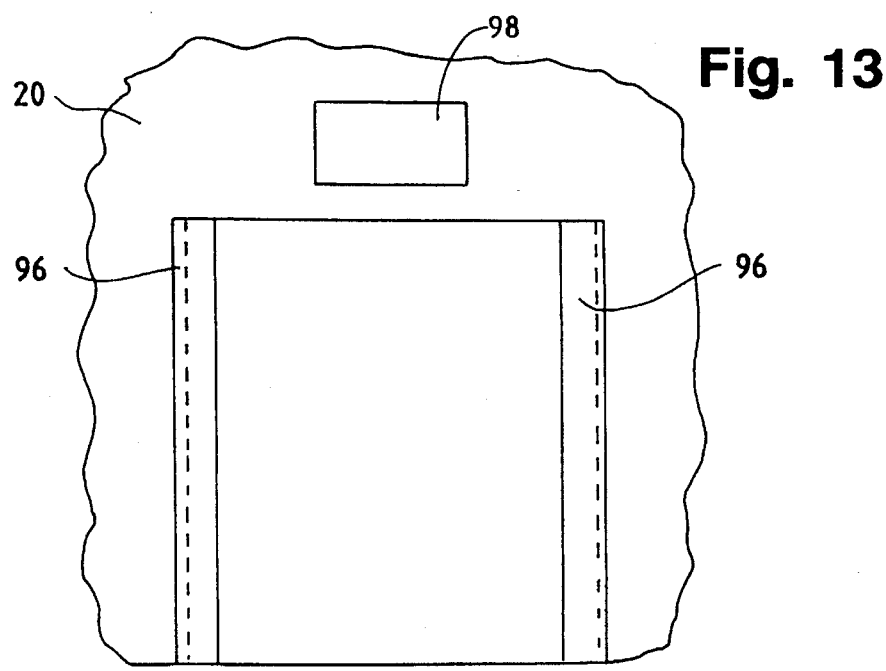

SPRING LOADED LATCH ASSEMBLY

FIELD OF THE INVENTION

The present invention relates generally to spring loaded latch assemblies, and more particularly to a spring loaded "push-push" latch assembly which provides movement to a movable member, such as a cup holder or ash tray, with respect to a stationery member or surface, between a closed or retracted position and an open or extended position upon impressing successive pushing forces upon the movable member where the assembly enables the latching mechanism to be disengaged and reset upon inadvertent pulling of the movable member from the closed position to the open position without damaging the latching mechanism.

BACKGROUND OF THE INVENTION

Latch assemblies having a "push-push" latching mechanism are utilized in various applications, such as automobile cup holders, ashtrays and similar devices. With reference to a cup holder, for example, the portion which holds the cup is typically a tray that is movable with respect to a stationary surface or cup holder subassembly. When not in use, the cup holder tray is positioned in a closed or retracted position with respect to the stationary surface, such as an automobile dashboard or the like.

When the cup holder is needed, a user merely pushes a release button inward, which is typically part of a latching mechanism separate from the movable tray portion of the cup holder. Upon pushing, the release button engages a latch member connected to the release button by a rod or other linkage member so as to eject the cup holder outwardly to an open or extended position away from the dashboard. A cup can then be inserted within the cup holder portion which holds the cup in position until desired.

Existing latch assemblies, however, are subject to damage if the movable cup holder portion is pulled away from the dashboard instead of being pushed inwardly when positioned in the closed or retracted position. Such pulling frequently occurs since users typically cannot readily discern whether a particular assembly is designed for a push-push operation. Attempts to label such assemblies to alert a user have not been successful and detract from the appearance of the assembly.

It therefore would be desirable to provide a spring loaded push-push latch assembly which provides movement of a movable member between closed and open positions upon pushing of the movable member and prevents damage to the latch mechanism of the assembly upon inadvertent pulling of the movable member when positioned in the closed position.

SUMMARY OF THE INVENTION

The invention provides a spring loaded latch assembly having a first stationary member secured to a desired stationary surface and a second movable member wherein the assembly provides controlled reciprocating movement between the two members from a first closed position to a second open position upon pushing engagement by a user. The first stationary member includes a housing, a spring member secured within a portion of the housing by a retaining member, and a latch arm connected thereto.

The second movable member includes an engagement member in operable communication with the spring of the first member so as to provide a spring force between the first and second members. The second member also includes a latch track for cooperative engagement with the latch arm of the first member wherein the latch track includes a channel formed therein having a predetermined path for guiding the latch arm therein and providing the controlled movement between the first and second members. The assembly also includes a release member for enabling disengagement of the latch arm from the latch track without causing damage to the first or second members.

The assembly also includes a snap-engagement member for enabling securing of the first member to a desired surface.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 1 is a perspective view illustrating a cup holder including the latch mechanism of the invention secured to a dashboard of an automobile in a closed or retracted position;

FIG. 2 is a perspective view of the cup holder and latch mechanism of FIG. 1 illustrated in an open or extended position;

FIG. 3 is a perspective partially exploded view of the latch mechanism of the invention illustrating the housing and latch track portions thereof;

FIG. 4 is a plan view of the latch track member illustrating the path followed by the latch arm and initial movement of the latch arm along the path;

FIG. 5 is a cross-sectional view of the latching mechanism illustrating deflecting movement of the latch arm upon movement to the position within the latch track illustrated in FIG. 4;

FIGS. 6–9 are plan views of the latch track member, similar to FIG. 4, illustrating various positions of the latch arm with respect to the latch track;

FIG. 10 is a cross-sectional view of the latching mechanism taken along line 10—10 of FIG. 3 illustrating the non-deflected position of the latch arm with respect to the latch track;

FIG. 11 is a cross-sectional view of the latching mechanism, similar to FIGS. 5 and 10, illustrating the disengagement of the latch arm from the latch track upon outward pulling of the movable cup holder mechanism;

FIG. 12 is a front elevational view of the assembled latching mechanism illustrated in FIG. 3; and FIG. 13 is a top plan view illustrating an engagement member for attachment of the assembly.

DESCRIPTION OF THE PREFERRED EMBODIMENTS

Referring to FIGS. 1–3, the latch mechanism of the present invention is designated generally by the reference numeral 10. The mechanism 10 substantially includes a first stationary housing member 12 and a second movable track member 14 which are designed for cooperative engagement as described herein.

The mechanism 10 is typically utilized in conjunction with a movable member 16, such as a cup holder or ash tray assembly, which is secured to a stationary surface 18, such as the dashboard of an automobile. It is to be understood, however, that the mechanism 10 can be utilized in a variety of applications without departing from the teachings of the present invention.

Briefly, in use, the mechanism 10 is designed to provide movement to the movable cup holder 16 upon "push-push" engagement of the cup holder 16 by a user. Accordingly, when the cup holder 16 is initially pushed from a closed or retracted position as illustrated in FIG. 1, the mechanism 10 is activated to propel the cup holder 16 outward in the direction of arrow "A", as illustrated in FIG. 2, to an open or extended position for accepting a cup therein.

After use, the cup holder 16 is pushed inward in the direction of arrow "B" so as to re-engage the mechanism 10 and retain the cup holder 16 in the closed position illustrated in FIG. 1. The mechanism 10 is designed to be repeatedly opened and closed over an indefinite period of time without having to be replaced. Details of the structure of the mechanism 10 will now be provided.

As FIG. 1 illustrates, the first stationary housing member 12 can be designed to be directly secured to a surface 20, such as a structural part of the dashboard 18. Alternatively, a stationary cup holder housing portion (not illustrated) can be provided with the cup holder 16 which in turn is secured as a complete assembly to the surface 20 or other portion of the dashboard 18. In either event, the housing member 12 is designed to be stationary during operation of the mechanism 10.

As FIG. 3 illustrates, the housing member 12 is preferably formed from plastic and substantially includes a base member 22 for securing the housing member 12 to the surface 20, such as with an adhesive, a fastener or other means. The housing member 12 also includes a tubular channel 24 formed with the base member 22 and a planar platform 26 formed with the tubular channel 24. It is to be understood, however, that the particular material, components, securement and shape of the housing member 12 can vary.

The tubular channel 24 includes a first open end 28, a second opposite closed end 30, and a spring 32 secured for compressive movement within the tubular channel 24 by a retainer 34. To enable engagement between the spring 32 and a portion of the cup holder 16 as described below, the tubular channel 24 includes a top slot 36 which extends from the first open end 28 to a position proximate the second closed end 30 of the tubular channel 24.

As FIGS. 3 and 12 illustrate, the retainer 34 is substantially cylindrical in shape with a diameter and length selected to be smaller than the diameter and length of the channel 24. In order to mount the retainer 34 within the channel 24, the retainer 34 includes a pair of ears 38, one each mounted on an opposite side of the retainer 34.

The ears 38 seat within respective ear slots 40, one each formed on opposite sides of the channel 24. The ear slots 40 extend substantially the entire length of the channel 24 and are closed at both ends thereof.

To engage the spring 32, the retainer 34 also includes four engagement lugs 42 positioned at approximately ninety degree intervals about the circumference of the retainer 34. The lugs 42 extend away from the retainer 34 to a position proximate the channel 24.

To assist in initially mounting the ears 38 within the ear slots 40, four mounting slots 44 are formed in the first open end 28 of the channel 24 and extend along the length of the channel 24 a slight distance to a position within the confines of the ear slots 40. The mounting slots 44 define a pair of tabs 46, one each on either side of the channel 24, which are flexible to enable outward movement of the tabs 46 for insertion of the ears 38 within the ear slots 40.

Accordingly, once the ears 38 of the retainer 34 are mounted within the ear slots 40, the retainer 34 can be engaged to compress the spring 32 within the channel 24 with the lugs 42. During movement of the spring 32 within the channel 24, the ears 38 ride within the ear slots 40.

To provide the desired push-push latching of the mechanism 10, the planar platform 26 includes a latch arm 48 connected thereto. To engage the track member 14, the latch arm 48 includes an engagement post 48a on one side thereof and a nib 48b on an opposite side thereof for sliding engagement with the platform 26 in a pivotable mode.

As FIG. 12 illustrates, the latch arm 48 is preferably mounted for pivotable movement with respect to the platform 26 by means of a snap-in fastener 50. As FIG. 3 illustrates, in order to restrict pivotable movement with respect to the platform 26 within a predetermined arc, two stops 52 are included on the platform 26, one each on opposite sides of the latch arm 48.

Additionally, to provide a constant engagement force between the latch arm 48 and track member 14 and enable flexing of the latch arm 48 in a direction substantially perpendicular to the plane containing the planar platform 26, the platform 26 includes a U-shaped cut out 54 extending therethrough which defines a flexible tongue 56. As FIG. 5 illustrates, the U-shaped cut out 54 enables the tongue 56 and latch arm 48 to flex in a direction perpendicular to the platform 26 and track member 14.

This flexing enables the latch arm 48 to ride up a ramped surface of the track member 14 as described in detail below. Additionally, as FIG. 11 illustrates, the flexing of the latch arm 48 also enables the latch arm 48 to become disengaged from the track member 14 when in the closed position upon inadvertent outward pulling of the cup holder 16 as described below.

As FIG. 3 illustrates, the track member 14 is secured to the cup holder 16, such as with an adhesive or the like, or can be molded as part of the cup holder 16. The track member 14 includes a bottom surface 58, a top surface 60, first and second opposite ends 62 and 64, and first and second opposite sides 66 and 68. To guide the post 48a of the latch arm 48, the track member 14 includes a three-dimensional path formed therein generally illustrated with the reference numeral 70.

The path 70 is substantially in the shape of the letter "Y" and includes a center island or "heart" shaped portion 72. The path 70 begins with a first entrance portion 74 which tapers inwardly from the first and second opposite sides 66 and 68 and is ramped upward toward the top surface 60 from the bottom surface 58.

The first entrance portion 74 leads to a second flat portion 76 which in turn leads to a third ramped portion 78 which slopes upward from the bottom surface 58 to the top surface 60. The third ramped portion 78 terminates in a first end wall 80 which restricts reverse movement of the latch arm 48.

A fourth pocket portion 82 is positioned between the first end wall 80 and a second end wall 84 which feeds the latch arm 48 to a fifth substantially planar hooked portion 86. The first and second end walls 80 and 84 effectively drop the latch arm 48 within the fifth portion 86 back down toward the bottom surface 58 to a depth or height approximately corresponding to the base height of the third ramped portion 78.

The fifth portion 86 defines a recess 88 with the island 72 for seating of the post 48a of latch arm 48 therein when the cup holder 16 is positioned in the closed position. The fifth portion 86 terminates in a third end wall 90 which provides a slight drop back down to the second flat portion 76 to complete the path 70.

In order to provide a spring force between the cup holder 16 and the spring 32 of the housing 12, the cup holder 16 includes a depending rib 92. When assembled, the rib 92 engages the retainer 34 and extends through the top slot 36 which enables the spring force to be provided between the cup holder 16 and the housing 12 when the cup holder 16 is in the closed position of FIG. 1 and during the opening and closing of the cup holder 16 as described below.

In operation, as FIG. 1 illustrates, the cup holder 16 is typically placed in the closed position when not in use. When a cup is desired to be held within the cup holder 16, the cup holder 16 is pressed inward by a user.

As FIG. 7 illustrates, when in the closed position the post 48a of the latch arm 48 is positioned within the recess 88 of the path 70 and is held therein by the force of the semi-compressed spring 32 acting upon the rib 92 of the cup holder 16 as denoted by the arrow. Upon inward pushing of the cup holder 16, the spring 32 is compressed further and the post 48a moves to the position illustrated in FIG. 8 within the fifth hooked portion 86.

As FIG. 2 illustrates, upon release of the cup holder 16 by the user, the spring 32 forces the cup holder outward in the direction of arrow "A" to the open or extended position. During this movement, the post 48a of the latch arm 48 moves from the position illustrated in FIG. 8 to the position illustrated in FIG. 9 within the second flat portion 76 of the path 70. As the cup holder 16 proceeds to the final open position illustrated in FIG. 2, the post 48a exits the path 70 and the track member 14 as illustrated in FIG. 9.

As FIG. 2 illustrates, to close the cup holder 16, a user again pushes the cup holder 16 inward in the direction of arrow "B". As FIG. 4 illustrates, this causes the post 48a to initially enter the first portion 74 of the track member 14.

As FIG. 6 illustrates, upon continued inward pushing of the cup holder 16, the post 48a moves up the second flat portion 76 and the third ramped portion 78 and is stopped when it engages the back wall of the fourth pocket portion 82. Upon release of inward pressure by the user, the post 48a then moves back into the recess 88 under the force of the spring 32 to the closed position illustrated in FIG. 7.

It is to be noted that as the post 48a of the latch arm 48 winds through the path 70, the swivel connection of the latch arm 48 by means of the fastener 50 enables the latch arm 48 to pivot to accommodate the desired movement of the latch arm 48 and post 48a. Additionally, the stops 52 assist in restricting the pivotal movement of the latch arm 48 which is particularly necessary to maintain alignment of the latch arm 48 with the first portion 74 of the track member 14.

As FIG. 5 illustrates, during movement of the post 48a within the path 70, the flexible tongue 56 enables the latch arm 48 and post 48a to flex in a direction substantially perpendicular to the direction of travel of the post 48a within the path 70. For example, as the post 48a rides up the third ramped portion 78, the tongue 56 enables the latch arm 48 to flex downward in the direction of arrow "C" to accommodate such movement without breaking the latch arm 48.

FIG. 11 illustrates an important feature of the mechanism 10. When the cup holder 16 is positioned in the closed position where the post 48a is within the recess 88 as illustrated in FIG. 7, occasionally, inadvertent outward pulling of the cup holder 16 occurs.

With existing push-push mechanisms, such outward pulling tends to break the mechanism. With the mechanism 10 of the present invention, however, the flexible tongue 56 enables the latch arm 48 to flex downward.

This enables the post 48a to be removed from the recess 88 thereby eliminating damage to the mechanism 10 during outward pulling of the cup holder 16. Once removed from the recess 88, the post 48a of the latch arm 48 is moved to the open position illustrated in FIG. 9 where it is essentially reset for further use.

FIGS. 12 and 13 illustrate mounting of the housing 12 to the stationary surface 20 of the dashboard 18 or another base portion of the cup holder member 16. To capture the base 22 of the housing 12 upon the surface 20, the surface 20 includes two L-shaped channels 96 thereon and a recess 98.

The base 22 slides between the channels 96 and includes a ramped stop rib 100 formed on the bottom of the base 22 and a pair of tabs 102, one each on opposite sides of the base 22. Accordingly, to attach the base 22 of the housing 12 to the surface 20, the base 22 is positioned between the channels 96.

Upon reaching the end of the channels 96, the tabs 102 abut the ends of the channel 96 to prevent further inward movement. At this point, the ramped stop rib 100 of the base 22 snaps within the recess 98 of the surface 20 and prevents outward movement of the base 22. The channels 96 and the surface 20 prevent up and down movement of the base 22 thereby securing the base 22 to the surface 20.

With this type of securement, substantially no parts extend beyond the confines of the cup holder 16 and housing 12. This is particularly important if the surface 20 is provided as part of a complete cup holder assembly for insertion within a dashboard aperture which frequently cannot accommodate any protruding elements.

It is to be noted that FIGS. 1 and 2 illustrate the mechanism 10 secured toward the front and right side of the cup holder 16. It is to be understood, however, that placement of the mechanism 10 can vary from front to back and right to left so long as it functions as described herein.

Modifications and variations of the present invention are possible in light of the above teachings. It therefore is to be understood that the invention may be practiced otherwise than as specifically described above.

I claim:

1. A push-push latch mechanism, comprising:

a first member having a latch arm movably secured by a first end thereof upon a first portion of said first member, and a latch member mounted upon a second end of said latch arm wherein said second end of said latch arm is movably supported upon a second portion of said first member;

a second track member operably connected to said latch member of said latch arm of said first member and comprising a path formed therein for guiding said latch member of said latch arm upon reciprocating sliding movement of said first and second members with respect to each other between a first closed position and a second opened position;

a spring mounted upon said first member and interposed between said first and second members for providing a biasing force between said first and second members so as to relatively bias said first and second members toward said opened position;

means defined upon said second member for retaining said latch member of said latch arm at a predetermined position, along said path, corresponding to said closed position defined between said first and second members when said first and second members are moved with respect to each other from said opened position to said closed position under the influence of a first push force in a first direction opposite to said biasing force of said spring, and yet permitting release of said latch member from said retaining means, so as to permit said first and second members to move with respect to each other from said closed position to said opened position, under the influence of a second push force in said first direction against said biasing force of said spring while said first and second members are retained at said closed position as a result of said latch member being retained by said retaining means; and means mounting said second portion of said first member upon said first member for permitting movement of said second portion of said first member and said latch member with respect to said first member for enabling disengagement of said latch member of said latch arm from said retaining means of said second track member when said first and second members are positioned at said first closed position and subjected to a pulling force in a second opposite direction so as to permit said first member and said second track member to be moved with respect to each other to said opened position without causing damage to said first and second members.

2. The mechanism as set forth in claim 1, wherein:

said latch arm is pivotably mounted upon said first member.

3. The mechanism as set forth in claim 1, wherein:

said first member comprises a dashboard of an automobile; and said second member comprises a beverage cup holder.

4. The mechanism as set forth in claim 1, wherein:

said first member comprises a dashboard of an automobile; and said second member comprises an ash tray assembly.

5. The mechanism as set forth in claim 2, further comprising:

snap-in fastener means for pivotably mounting said first end of said latch arm upon said first member.

6. The mechanism as set forth in claim 2, further comprising:

stop means fixedly mounted upon said first member upon opposite sides of said latch arm for limiting said pivotable movement of said latch arm with respect to said first member.

7. The mechanism as set forth in claim 1, wherein:

said means mounting said second portion of said first member upon said first member comprises a substantially U-shaped cut-out portion defined between said second portion of said first member and remaining portions of said first member such that said second portion of said first member comprises a flexible tongue portion mounted in a cantilevered manner upon said first member and upon which said second end of said latch arm is movably supported such that said second flexible tongue portion, and said second end of said latch arm having said latch member mounted thereon, can flex substantially perpendicular to a plane within which said first member is disposed.

8. A spring-loaded latch assembly, comprising:

a first stationary member having a housing disposed thereon, a spring member disposed within said housing, a latch arm movably mounted at a first end thereof upon a first portion of said first stationary member, and a latch mechanism mounted upon a second end of said latch arm wherein said second end of said latch arm is movably supported upon a second portion of said first stationary member;

a second movable member mounted upon said first stationary member for controlled reciprocating movement with respect to said first stationary member between a first closed position and a second opened position, said second movable member including an engagement member operatively engaged with said spring member of said housing so as to provide a spring biasing force between said first and second members toward said opened position of said second movable member;

a latch track member, defined upon said second movable member for cooperative engagement with said latch mechanism of said latch arm of said first stationary member, comprising a channel formed therein and having a predetermined path for guiding said latch mechanism of said latch arm therein so as to provide said controlled movement between said first and second stationary and movable members, and means for retaining said latch mechanism of said latch arm at a predetermined position corresponding to said closed position of said second movable member, when said second movable member is moved from said opened position to said closed position under the influence of an engagement force applied to said second movable member in a first direction opposite to said biasing force of said spring member, and yet permitting release of said latch mechanism from said retaining means, so as to permit said second movable member to move from said closed position to said opened position, when said second movable member is subjected to an engagement force in said first direction against said biasing force of said spring member while said second movable member is retained at said closed position as a result of said latch mechanism being retained by said retaining means; and means mounting said second portion of said first stationary member upon said first stationary member for permitting movement of said second portion of said first stationary member and said latch mechanism with respect to said first stationary member for enabling disengagement of said latch mechanism of said latch arm from said retaining means of said latch track member when said second movable member is positioned at said first closed position and when said second movable member is subjected to a disengagement force in a direction substantially opposite to said engagement force in said first direction so as to permit said second movable member to be moved to said second opened position without causing damage to said first and second members.

9. The assembly as defined in claim 8, wherein:

said means for enabling disengagement of said latch mechanism mounts said latch arm upon said first stationary member such that said latch arm and said latch mechanism are biased toward said latch track channel during movement of said latch arm mechanism therein.

10. The assembly as defined in claim 8 wherein said latch track channel includes several portions, at least one of said portions including a component which extends in a plane substantially perpendicular to the remaining portions of said latch track channel.

11. The assembly as defined in claim 8 wherein said latch arm is pivotably mounted upon said first member.

12. The assembly as set forth in claim 8, wherein:

said first stationary member comprises a dashboard of an automobile; and said second movable member comprises a beverage cup holder.

13. The assembly as set forth in claim 8, wherein:

said first stationary member comprises a dashboard of an automobile; and said second movable member comprises an ash tray assembly.

14. The assembly as set forth in claim 11, further comprising:

snap-in fastener means for pivotably mounting said first end of said latch arm upon said first stationary member.

15. The assembly as set forth in claim 11, further comprising:

stop means fixedly mounted upon said first stationary member upon opposite sides of said latch arm for limiting said pivotable movement of said latch arm with respect to said first stationary member.

16. The assembly as set forth in claim 8, wherein:

said means mounting said second portion of said first stationary member upon said first stationary member comprises a substantially U-shaped cut-out portion defined between said second portion of said first stationary member and remaining portions of said first stationary member such that said second portion of said first stationary member comprises a flexible tongue portion mounted in a cantilevered manner upon said first stationary member and upon which said second end of said latch arm is movably supported such that said second flexible tongue portion, and said second end of said latch arm having said latch mechanism mounted thereon, can flex substantially perpendicular to a plane within which said first stationary member is disposed.

* * * * *